A. ASCHÉRI.
DETACHABLE TIRE TREAD.
APPLICATION FILED AUG. 19, 1909.
1,053,953.
Patented Feb. 18, 1913.
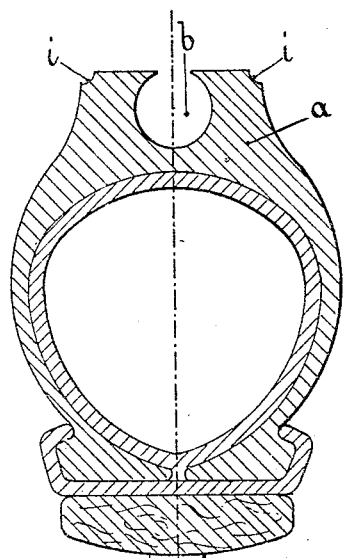
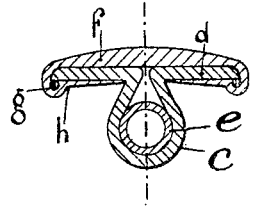
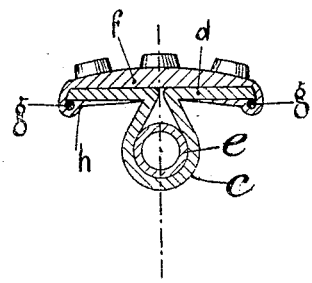
WITNESSES
W. P. Burk
John A. Percival
INVENTOR
Antoine Aschéri

UNITED STATES PATENT OFFICE.

ANTOINE ASCHÉRI, OF PUTEAUX, FRANCE.

DETACHABLE TIRE-TREAD.

1,053,953.

Specification of Letters Patent. Patented Feb. 18, 1913.

Application filed August 19, 1909. Serial No. 513,687.

*To all whom it may concern:*

Be it known that I, ANTOINE ASCHÉRI, a citizen of the Republic of France, residing at 15 Rue Volney, Puteaux, Seine, France, have invented certain new and useful Improvements in Detachable Tire-Treads, of which the following is a specification.

The subject of this invention consists of a detachable tread provided with a hollow locking flange engaging a groove formed in the outer tube of the tire.

The surface of the tread is continuous, thus forming an annular tread which is provided with an inwardly extending locking flange adapted to engage a corresponding groove in the outer tube. The flange preferably contains an inner air tube.

Treads provided with portions which are inserted into grooves in the outer tube are known, but these treads are formed of separated elements and do not contain an air-chamber, nor are they provided with a closed annular space in lieu thereof. Therefore they very easily clog or choke, the groove being open and exposed so that it can receive all the foreign bodies on the route and the dust and sand; besides, they do not possess the same elasticity and the same suppleness as a closed tire containing air.

Figure 1 is a cross sectional view of a tire, the tread portion being removed. Fig. 2 is a cross sectional view of the tread portion showing it provided with anti-skidding devices. Fig. 3 is a view similar to Fig. 2, the tread being free of anti-skidding devices.

In the drawing (Fig. 1) is shown, in section, one method of carrying out the invention. In the outer tube, $a$, of a pneumatic tire is formed an annular channel or groove, $b$, which receives the hollow flange, $c$, of the continuous annular tread, $d$. Within the flange, $c$, there is provided an air tube, $e$, by means of which the walls of the locking flange are pressed against the wall of the groove in such manner as to produce a secure and elastic engagement.

Referring to Figs. 2 and 3 in which the tread is shown the flange $c$ is formed from a strip of leather suitably folded, and the air tube $e$ is situated in the hollow space formed by this strip. The ends of the strip $c$ are, after the introduction of the chamber $e$, held fast between the upper portion $d$ of the tread and the folded-in edges $h$ thereof. Finally, the locking cables $g$ are introduced between the edges $h$ and the leather $c$ under which they are placed. The result of this arrangement of the cables is that when the detachable tread is placed in position in the annular groove $i$ provided in the outer tube, the cables exert pressure only upon the edges $h$ and do not bear directly upon the edges of the leather $c$, which, if the contrary were the case, they would have a tendency to separate from each other at $k$, which would injure the edges of the groove $b$ of the outer tube $a$ and would tend to raise the central flange $c$ from the groove.

Having described the invention, what is claimed as new is—

In a tire, in combination, an outer tube having a circumferential groove therein, and a continuous annular detachable tread, said tread comprising a strip folded to form a hollow inwardly-extending flange adapted to engage within said groove, a second strip positioned above said first strip and having its edges folded to extend between the edges of said first strip and the outer tube, and locking cables interposed between the folded edges of said second strip and the edges of said first strip, said hollow flange having an air tube positioned therein.

In testimony whereof I have affixed my signature, in presence of two witnesses.

ANTOINE ASCHÉRI.

Witnesses:
DEAN B. MASON,
DOUM'E CASALONGA.